United States Patent Office 3,180,661
Patented Apr. 27, 1965

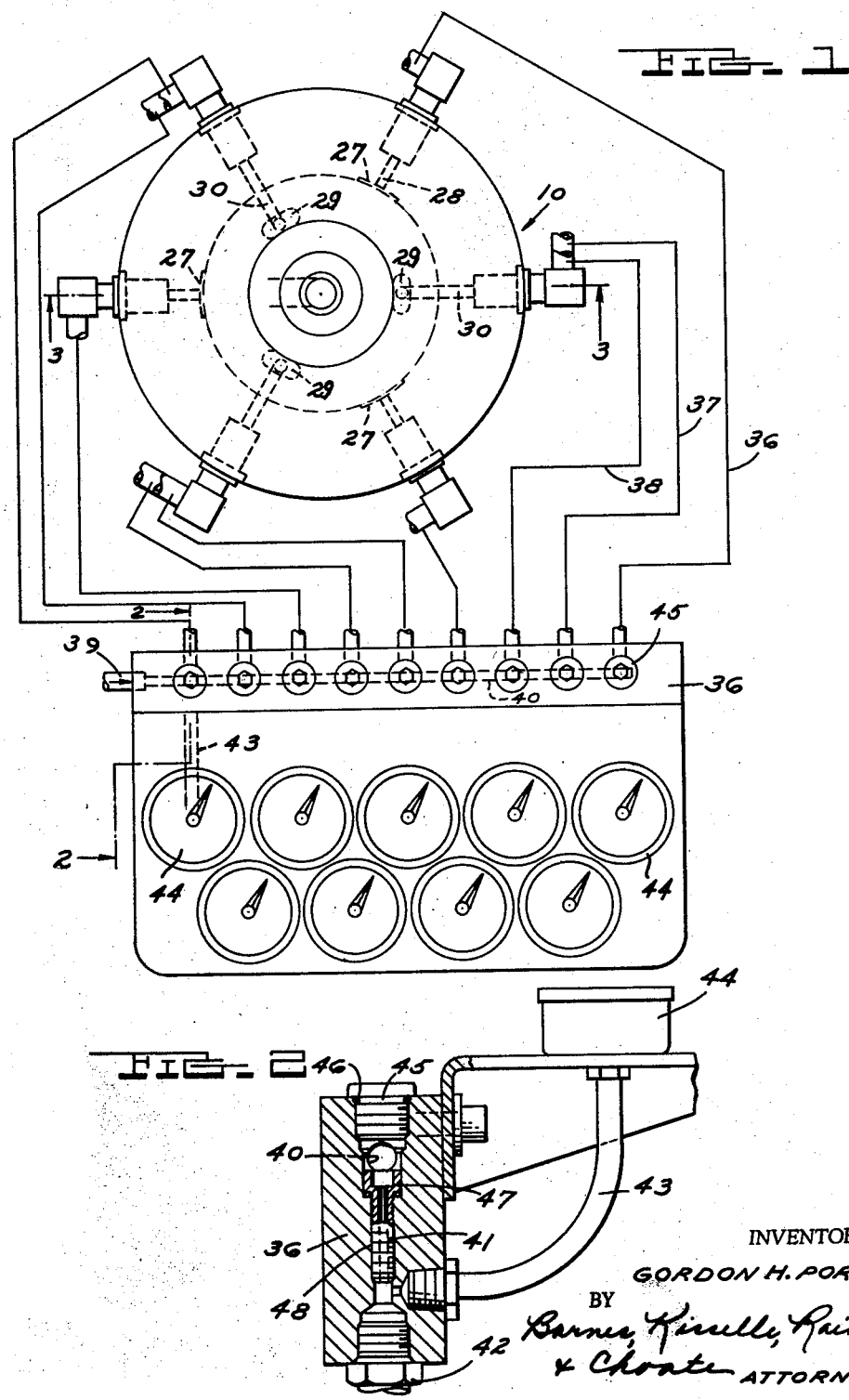

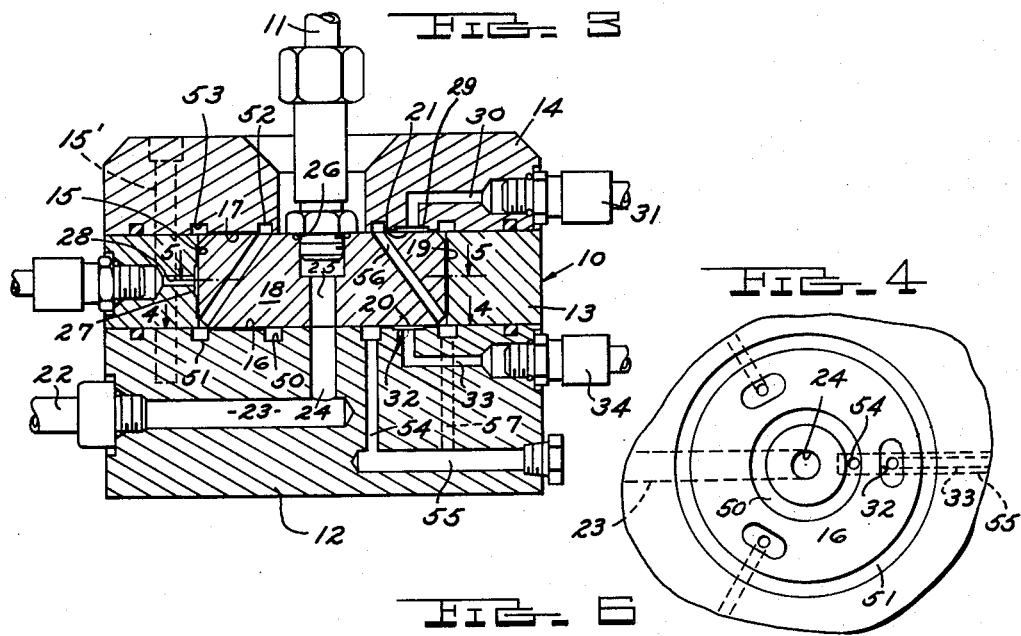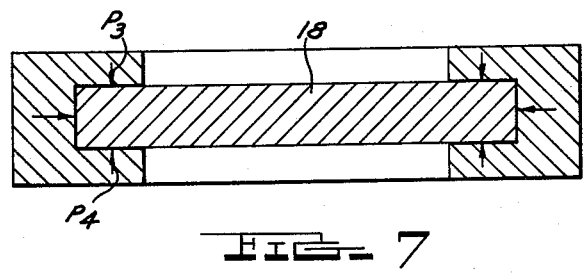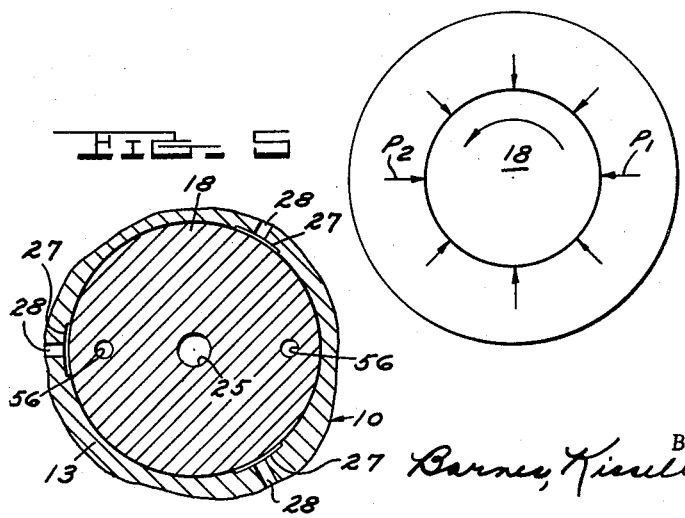

3,180,661
ROTARY HYDRAULIC FITTING
Gordon H. Porath, 6101 Concord, Detroit, Mich.
Filed Dec. 6, 1962, Ser. No. 242,885
14 Claims. (Cl. 285—93)

This invention relates to rotary hydraulic fittings and particularly to such fittings that are intended to be used with scientific devices wherein any drag or friction in the fitting is detrimental.

It is an object of this invention to provide a novel rotary hydraulic fitting wherein the rotary member is stabilized radially in a housing and axially in the housing and metal-to-metal contact is prevented, thus avoiding direct friction.

It is a further object of the invention to provide such a rotary hydraulic fitting wherein movement of the rotary member is smooth and vibration free.

It is a further object of the invention to provide such a rotary hydraulic fitting wherein the rotary member is completely resistant to shock load.

It is a further object of the invention to provide a rotary hydraulic fitting wherein there is substantially no wear and such wear that occurs is automatically compensated for.

It is a further object of the invention to provide such a rotary hydraulic fitting which utilizes a great variety of hydraulic fluids to provide a liquid film between the adjacent surfaces of the housing and the rotary member.

It is a further object of the invention to provide such a rotary hydraulic fitting which may utilize the same liquid that is transmitted through the fitting to compensate for loads on the rotary member.

It is a further object of the invention to provide such a rotary hydraulic fitting which does not require seals which are difficult to fabricate and maintain.

Basically, the rotary hydraulic fitting comprises a housing that provides an annular axial surface and inwardly extending annular radial surfaces intersecting the axial surface. A rotary member comprising the connector or fitting through which the fluid transmitted by the fitting passes has complementary axial and radial surfaces adjacent the axial and radial surfaces of the housing. Each of the axial and radial surfaces of the housing is formed with a plurality of circumferentially spaced pockets or pressure pads to which liquid under pressure is provided from orifices, preferably comprising capillary tubes. The liquid flows continuously at a low velocity from the pad between the surfaces of the housing and rotary member providing a thin film of liquid at all times between the surfaces. In the event of a load either axially or radially on a pad, the rotary member is moved toward one pressure pad increasing the pressure therein because of the restricting action and away from an opposed pressure pad decreasing the pressure therein because of the unrestricting action so that a pressure differential is created that tends to return the rotary member to its original position. The liquid that is flowing continuously passes to drain passages in the housing and the pressures are so arranged that the liquid is substantially at zero pressure in the drain opening. Further, in accordance with the invention, the orifices are positioned remotely of the housing in a manifold and gauges are associated with each said orifice downstream thereof in order that it can be readily ascertained by inspection that each pad has the desired pressure thereon.

In the drawings:

FIG. 1 is a partly diagrammatic view of an apparatus embodying the invention.

FIG. 2 is a fragmentary sectional view on an enlarged scale taken along the line 2—2 in FIG. 1.

FIG. 3 is a sectional view taken along the line 3—3 in FIG. 1.

FIG. 4 is a sectional view taken along the line 4—4 in FIG. 3.

FIG. 5 is a sectional view taken along the line 5—5 in FIG. 3.

FIG. 6 is a diagrammatic axial sectional view showing the axial compensation achieved in the rotary hydraulic fitting.

FIG. 7 is a diagrammatic view representing the radial compensation achieved in the rotary hydraulic fitting.

Referring to FIGS. 1 and 3, the rotary hydraulic fitting 10 is adapted to provide oil or similar liquid to a connector 11 that, in turn, is connected to a piece of apparatus in such a way that relative rotation may occur between the fitting 10 and the connector 11. Such a fitting may, for example, be found in various hydraulic mechanisms such as are used in scientific experimentation and inspection.

The rotary fitting 10 comprises a base member 12, an intermediate annular member 13 and an upper or top annular member 14 clamped together as by means of bolts 15' to form a housing. Intermediate annular member 13 defines an inwardly facing cylindrical surface 15 and cooperates with the bottom member 12 and top member 14 to define annular flat radial surfaces 16, 17 extending radially inwardly from and intersecting the axial cylindrical surface 15. A rotary member 18 on which the connector 11 is mounted is positioned in the body 10 by the surfaces 15, 16 and 17 and includes an axial cylindrical surface 19 and annular radial surfaces 20, 21 which are complementary to surfaces 15, 16, 17, respectively.

The fluid transmitted to the connector 11 enters the body 10 through an inlet 22 in the base member 12 that connects with a radial passage 23 which, in turn, connects with an axial passage 24 that communicates with an opening 25 extending axially through the rotary member 18. The connector 11 is threaded into the opening 25, a seal being formed by an O ring 26.

In accordance with the invention, axial cylindrical surface 15 is provided with a plurality of circumferentially and equally spaced pockets or pressure pads 27. Liquid under pressure is supplied to each pad through a passage 28 extending radially from the peeriphery of body 10 and intermediate member 13 to each pressure pad 27. Similarly, each of the annular surfaces 16, 17 is provided with a plurality of circumferentially and equally spaced pockets or pressure pads 32, 29 (FIGS. 3, 4) to which liquid is provided by passages 33, 30 receiving liquid from inlets 34, 31 in the upper and lower members, respectively.

Referring to FIGS. 1 and 2, an orifice in the form of a capillary is associated with each of the pads 27, 29, 32 to provide liquid under pressure to each of the pads. Conduits or lines extend from a manifold 36 to the passages that lead to each of the pads. Thus, as shown in FIG. 1, conduits 36 extend from the manifold to the passages 28 which, in turn, supply liquid to the pads 27. Similarly, conduits 37 supply liquid to the passages 33 and conduits 38 supply liquid to the passages 30.

As shown in FIG. 2, liquid from a pressure source not shown passes to inlet 39 of manifold 36 and thence to the inlet area 40 of a capillary tube 41 in the manifold 36, one capillary tube 41 being provided for each of the pressure pads. The liquid passes through the capillary tube 41 thus having a predetermined pressure drop and thereafter outwardly through outlet 42 to one of the conduits 36, 37, 38, depending upon which of the conduits corresponds to that respective orifice. At the same time, a tube 43 having one end positioned adjacent the outlet of the capillary tube 41 provides communication with a pressure gauge 44 to continuously indicate the pressure of the liquid being in its respective pressure pad. By this arrangement, it is possible to immediately note when a pressure pad is not operating properly as, for example, if the capillary tube becomes clogged. In order to provide access to the capillary tube 41, a cap 45 is threaded into the opening in which the capillary tube is provided. An O ring 46 provides a proper seal. The capillary tube 41 is silver soldered in an Allen head screw 47 that is threaded into an opening 48 in the manifold 36, thus providing a readily accessible and replaceable orifice. The use of a capillary as the orifice provides an arrangement wherein a fixed control is achieved of the pressure with minimum danger of clogging.

The size and number of pressure pads is selected such that the rotary member will be effectively supported out of contact with the housing. The relative dimensions between the complementary axial and radial surfaces of the members is such that a thin film of liquid flows at a low velocity and in laminar fashion between the surfaces and substantially all the pressure of the liquid is dissipated when it finally leaves the space between the surfaces. The space between the surfaces may range between two-thousandth (0.002) of an inch and one ten-thousandth (0.0001) of an inch and preferably between one-thousandth (0.001) of an inch and one ten-thousandth (0.0001) of an inch. In larger size rotary fittings where machining limitations prevent obtaining uniform control of dimensions, satisfactory results will be achieved provided that at least some portions of the spaces between the surfaces are within the above limits.

The pressure may vary. For example, satisfactory results have been achieved by providing liquid at 100 pounds per square inch to each capillary tube 41, which, in turn, reduces the pressure to 50 pounds per square inch at each pressure pad. Thus, the liquid at predetermined pressure flows from each pressure pad between the surfaces continuously at a low velocity and in a laminar fashion until it is at substantially zero pressure when it finally leaves the space between the surfaces to provide a thin fluid film at all times between the surfaces.

As shown in FIGS. 3 and 4, the surface 16 of lower member 12 is formed with inner and outer annular radial grooves 50, 51 to which the liquid flows radially outwardly from pads 29. In addition, the liquid flows downwardly from pads 27 into grooves 51. Similarly, the undersurface 17 of the top member 14 is provided with inner and outer annular radial grooves 52, 53 to which the liquid from the pads 27 passes radially inwardly and outwardly. The liquid from groove 50 passes downwardly through a vertical passage 54 in member 12 to radial outlet 55. The liquid from upper inner groove 52 passes through diagonal openings 56 in rotary member 18 to the groove 51. Grooves 53, 51 are connected to vertical passages 57 which, in turn, pass to the drain opening 55.

The provision of a low velocity laminar flow of liquid between the surfaces of the housing and the rotary member effectively eliminates any friction due to metal-to-metal contact and provides a fitting that will compensate for loads that are inadvertently applied on the connector 11. The liquid flowing from the pads to the drain loses substantially all of its pressure in so doing and, as a result, there is no problem of final drainage of the liquid.

The manner of operation of the rotary hydraulic fitting can be more readily understood by referring to diagrammatic drawings FIGS. 6 and 7. FIG. 7 represents the relative arrangement provided by the pressure pads 27. Each pressure pad provides a pressure force continuously at predetermined pressure as represented by the arrows. In the event that a force is applied on the rotary member 18 tending to cause the rotary member to move, for example, to the left, the pressure $P_2$ in the opposite pressure pad will increase because of the restrictive action of the relative movement of the rotary fitting and the pressure $P_1$ will decrease producing a pressure differential that will tend to return the rotary member 18 to its original centered position. It should be understood that the relative movements herein described are very slight such that they cannot be seen or measured.

Similarly, any movement of the rotary member 18 axially as, for example, up as shown in FIG. 6, causes the pressure $P_3$ in the pressure pads on the top surface of member 18 to increase and the pressure $P_4$ of the pressure pads on the bottom surface to decrease producing a pressure differential which tends to return the member 18 into its central axial position.

Because the pressure pads fully compensate for loads on the rotary member 18, the arrangement is also capable of accommodating for minor surface or machining inaccuracies that inherently occur in commercial machine practices.

The provision of the orifices or capillaries at a place remote from the rotary fitting reduces the size of the rotary fitting and makes for easier maintenance and more ready access to the capillaries as may be required for inspection and repair, if needed.

The pressurized areas function, in addition, as seals to prevent liquid flowing through the fitting from escaping.

This application is a continuation-in-part of my co-pending application, Serial No. 173,532, filed February 15, 1962, titled Machine Tool Spindle now abandoned.

I claim:

1. In a rotary hydraulic fitting, the combination comprising
    a body having an annular generally axial inwardly facing surface and opposed generally radial surfaces intersecting the axial surface,
    a rotary member having substantially complementary axial and radial surfaces positioned in said body,
        said body having an axial fluid passage therethrough,
    said passage having one end thereof extending through one of said radial surfaces of said body and the other end thereof extending to the exterior of said fitting,
    said rotary member having an axial fluid opening therethrough,
    said opening extending through said radial surfaces of said rotary member and having one end thereof aligned and communicating with said one end of said passage in said body,
    a plurality of diametrically opposed circumferentially spaced pressure pads on each of said axial and radial surfaces of said body,
    an orifice associated with each said pad for supplying liquid under predetermined pressure to said pad,
    a gauge associated with each said pad for indicating the pressure of said pad,
    the relative dimensions of said body and said rotary member being such that a pressurized film of liquid flows continuously at low velocity between said surfaces from each said pressure pad to a drain opening in said body providing a permanent separation of the surfaces and retaining the rotary member in stable, accurate, frictionless, relation to the body without the use of seals between said body and said rotary member.

2. In a rotary hydraulic fitting, the combination comprising
    a body having an annular generally axial inwardly facing surface and opposed generally radial surfaces intersecting the axial surface,
    a rotary member having substantially complementary axial and radial surfaces positioned in said body,
        said body having an axial fluid passage therethrough,
    said passage having one end thereof extending through one of said radial surfaces of said body and the other end thereof extending to the exterior of said fitting, said rotary member having an axial fluid opening therethrough, said opening extending through said radial surfaces of said rotary member and having one end thereof aligned and communicating with said one end of said passage in said body, a plurality of diametrically opposed circumferentially spaced pressure pads on each of said axial and radial surfaces of said body, an orifice associated with each said pad for supplying liquid under predetermined pressure to said pressure pad, a gauge associated with each said pressure pad for indicating the pressure of said pad, said body being provided with annular drains in the radial surfaces thereof, the relative dimensions of said body and said rotary member being such that a pressure film of fluid continuously flows between said surfaces and from each said pressure pad to a drain opening in said body providing a permanent separation of the surfaces and retaining the rotary member in stable, accurate, frictionless, relation to the body without the use of seals between said body and said rotary member.

3. In a rotary hydraulic fitting, the combination comprising a body having an annular generally axial inwardly facing surface and opposed generally radial surfaces intersecting the axial surface, a rotary member having substantially complementary axial and radial surfaces positioned in said body, said body having an axial fluid passage therethrough, said passage having one end thereof extending through one of said radial surfaces of said body and the other end thereof extending to the exterior of said fitting, said rotary member having an axial fluid opening therethrough, said opening extending through said radial surfaces of said rotary member and having one end thereof aligned and communicating with said one end of said passage in said body, a plurality of diametrically opposed circumferentially spaced pressure pads on each of said axial and radial surfaces of said body, an orifice associated with each said pressure pad for supplying hydraulic fluid under predetermined pressure to said pressure pad, a gauge associated with each said pressure pad for indicating the pressure of said pressure pad, said body having inner and outer annular drains on the radial surfaces thereof with said pressure pads being equally spaced radially between said drains so that liquid flows continuously from said pressure pads to said drains, the relative dimensions of said body and said rotary member being such that a pressurized film of liquid flows continuously between said surfaces and from each said pressure pad to a drain opening in said body providing a permanent separation of the surfaces and retaining the rotary member in stable, accurate, frictionless, relation to the body without the use of seals between said body and said rotary member.

4. In a rotary hydraulic fitting, the combination comprising a body having an annular generally axial inwardly facing surface and opposed generally radial surfaces intersecting the axial surface, a rotary member having substantially complementary axial and radial surfaces positioned in said body, a plurality of diametrically opposed circumferentially spaced pressure pads on each of said axial and radial surfaces of said body, an orifice associated with each said pressure pad for supplying liquid under predetermined pressure to said pressure pad, a gauge associated with each said pad for indicating the pressure of said pressure pad, said body being provided with annular drains in the radial surfaces thereof, the relative dimensions of said body and said rotary member being such that a pressure film of fluid flows continuously between said surfaces and from each said pressure pad to a drain opening in said body providing a permanent separation of the surfaces and retaining the rotary member in stable, accurate, frictionless, relation to the body without the use of seals between said body and said rotary member, said rotary member having a fluid passage extending axially therethrough, said body having a passage therein connected to said opening for supplying fluid to one side of said opening in said rotary member, and a connector fixed to the other side of said rotary member and communicating with the opening therein, said connector extending externally of said body.

5. In a rotary hydraulic fitting, the combination comprising a body having an annular generally axial inwardly facing surface and opposed generally radial surfaces intersecting the axial surface, a rotary member having substantially complementary axial and radial surfaces positioned in said body, a plurality of diametrically opposed circumferentially spaced pressure pads on each of said axial and radial surfaces of said body, an orifice associated with each said pressure pad for supplying liquid under predetermined pressure to said pressure pad, a gauge associated with each said pressure pad for indicating the pressure of said pressure pad, said body having inner and outer annular drains on the radial surfaces thereof with said pressure pads being equally spaced radially between said drains so that liquid flows continuously from said pressure pads to said drains, the relative dimensions of said body and said rotary member being such that a pressure film of liquid flows continuously between said surfaces and from each said pressure pad to a drain opening in said body providing a permanent separation of the surfaces and retaining the rotary member in stable, accurate, frictionless, relation to the body without the use of seals between said body and said rotary member, said rotary member having a liquid opening extending axially therethrough, said body having a passage therein connected to said opening for supplying fluid to one side of said opening in said rotary member, and a connector fixed to the other side of said rotary member and communicating with the opening therein, said connector extending externally of said body.

6. In a rotary hydraulic fitting, the combination comprising a body having an annular generally axial inwardly facing surface and opposed generally radial surfaces intersecting the axial surface, a rotary member having substantially complementary axial and radial surfaces positioned in said body, said body having an axial fluid passage therethrough, said passage having one end thereof extending through one of said radial surfaces of said body and the other end thereof extending to the exterior of said fitting, said rotary member having an axial fluid opening therethrough, said opening extending through said radial surfaces of said rotary member and having one end thereof aligned and communicating with said one end of said passage in said body, a plurality of diametrically opposed circumferentially spaced pressure pads on each of said axial and radial surfaces of said body, an orifice associated with each said pressure pad for supplying liquid under predetermined pressure to said pressure pad, each said orifice being positioned remote from its respective pressure pad and said body, and a line extending between the orifice to said body, a passage in said body extending from each said line to a pressure pad, a gauge associated with each said pressure pad for indicating the pressure of said pressure pad, the relative dimensions of said body and said rotary member being such that a pressurized film of liquid flows continuously between said surfaces and from each said pad to a drain opening in said body providing a permanent separation of the surfaces and retaining the rotary member in stable, accurate, frictionless, relation to the body without the use of seals between said body and said rotary member.

7. The combination set forth in claim 6 wherein said orifices are mounted in a common manifold, each said gauge communicating with a point adjacent the outlet of each said orifice.

8. The combination set forth in claim 7 wherein each said orifice comprises a capillary tube.

9. In a rotary hydraulic fitting, a body comprising a lower base member, an annular intermediate member defining an inwardly facing axial surface and forming with said base member a generally radially extending surface intersecting said axial surface, and an annular top member forming a generally radial surface intersecting said axial surface of said annular intermediate member and extending radially inwardly thereof, a rotary member having an axial peripheral surface and opposed radial annular surfaces positioned in said body with the axial surface of said rotary member adjacent the axial surface of said annular intermediate member and one of the radial surfaces of said rotary member adjacent the annular radial surface of the lower base member and the other of the radial surfaces of the rotary member adjacent the radial surface of the top member, said base member having an axial fluid passage therethrough, said rotary member having an axial fluid opening therethrough extending through said radial surface of said rotary member which is adjacent said base member, said opening being aligned and communicating with said passage in said base member, each of said axial and radial surfaces of the body having circumferentially spaced and diametrically opposed pressure pads, passages in said body extending to said pressure pads, an orifice associated with each said pressure pad for providing hydraulic fluid at a predetermined pressure to said pressure pad, and drain openings in said body so that a pressurized film of liquid continuously flows from each said pressure pad to the drain openings between the axial and radial surfaces of the body and the rotary member so that forces on the rotary member are balanced by build-up of the pressure in the pads and tend to return the rotary member to its original position relative to the body providing a permanent separation of the surfaces and retaining the rotary member in stable, accurate, frictionless, relation to the body without the use of seals between said rotary member and said base member, intermediate member and top member.

10. In a rotary hydraulic fitting, the combination comprising a body having an annular axial inwardly facing surface and opposed annular radial surfaces intersecting the axial surfaces at a right angle, a rotary member positioned in said body and having an annular cylindrical axial surface and annular opposed generally radial surfaces adjacent the axial and radial surfaces of the body, said body having an axial fluid passage therethrough, said passage having one end thereof extending through one of said radial surfaces of said body and the other end thereof extending to the exterior of said fitting, said rotary member having an axial fluid opening therethrough, said opening extending through said radial surfaces of said rotary member and having one end thereof aligned and communicating with said one end of said passage in said body, a plurality of circumferentially spaced pressure pads on each of the axial and radial surfaces of said body, an orifice associated with each said pressure pad, means for supplying liquid fluid to each said pressure pad through said orifice whereby pressurized liquid fluid is supplied to each said orifice, and drain openings in said body so that liquid flows continuously between each said pad and the drain opening, the dimensions of said body and said rotary member being such that a pressurized liquid flows continuously between the adjacent surfaces of said body and said rotary member and substantially the entire pressure of said liquid in the pad is dissipated when the liquid reaches the drain openings providing a permanent separation of the surfaces and retaining the rotary member in stable, accurate, frictionless, relation to the body without the use of seals between said body and said rotary member.

11. The combination set forth in claim 10 including a manifold remote from said body, said manifold having an inlet, each said orifice being positioned in said manifold, and lines extending from the outlet of each said orifice to its respective pad.

12. The combination set forth in claim 11 wherein each said orifice comprises a capillary tube.

13. In a pressurized fluid bearing system wherein a pair of members are mounted with accurately formed surfaces, one of the surfaces having a plurality of pressure pads therein, the improvement comprising a manifold remote from said members, said manifold having an inlet to which liquid under predetermined pressure is supplied, a removable capillary tube individual to each said pressure pad positioned in said manifold for receiving said liquid under predetermined pressure, said manifold having an outlet from each said capillary tube, and conduit means individual to each said outlet and extending to a respective pressure pad.

14. In a rotary hydraulic fitting, the combination comprising a body having an annular generally axial inwardly facing surface and opposed generally radial surfaces intersecting the axial surface, a rotary member through which hydraulic fluid is adapted to pass having substantially complementary axial and radial surfaces positioned in said body, said body having an axial fluid passage therethrough, said passage having one end thereof extending through one of said radial surfaces of said body and the other end thereof extending to the exterior of said fitting, said rotary member having an axial fluid opening therethrough, said opening extending through said radial surfaces of said rotary member and having one end thereof aligned and communicating with said one end of said passage in said body, a plurality of circumferentially spaced pressure pads on each of said axial and radial surfaces of said body, an orifice associated with each said pad for supplying liquid under predetermined pressure to said pad, a gauge associated with each said pad for indicating the pressure of said pad, the relative dimensions of said body and said rotary member being such that a pressurized film of liquid flows continuously at low velocity between said surfaces from each said pressure pad to a drain opening in said body providing a permanent separation of the surfaces and retaining the rotary member in stable, accurate, frictionless, relation to the body without the use of seals between said body and said rotary member, said liquid flowing through the rotary member being of the same type as the liquid supplied to the pressure pads.

References Cited by the Examiner

UNITED STATES PATENTS 2,578,711  12/51  Martellotti _____ 308—122

FOREIGN PATENTS 606,146  7/54  Canada.

FRANK SUSKO, *Primary Examiner.*